(No Model.)
P. DIEHL.
NEEDLE BAR FOR SEWING MACHINES.
No. 478,576. Patented July 12, 1892.
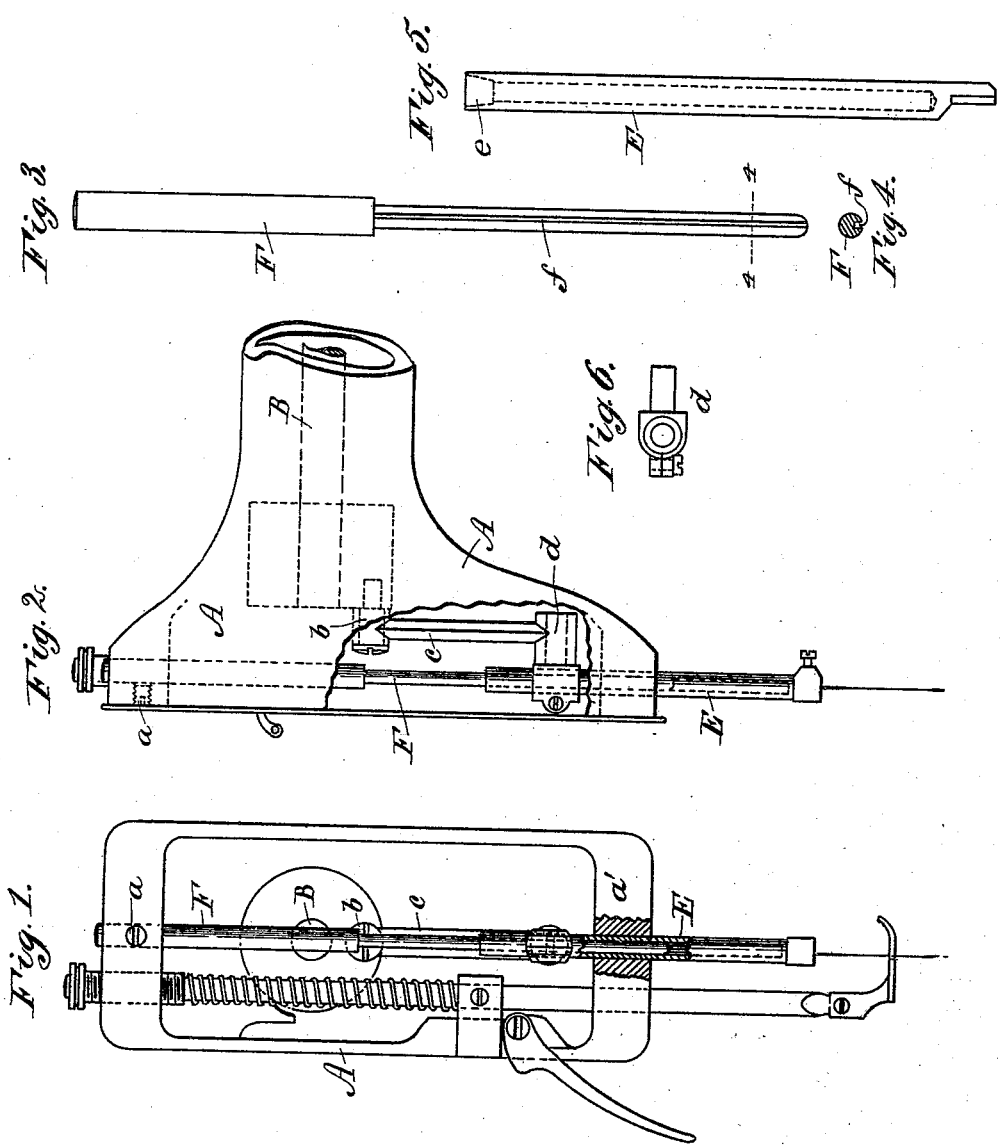
WITNESSES:
O. S. Cushman
C. M. Sweeney
INVENTOR
Philip Diehl
BY
Macleod Calver & Randall
ATTORNEYS.

UNITED STATES PATENT OFFICE.

PHILIP DIEHL, OF ELIZABETH, NEW JERSEY, ASSIGNOR TO THE SINGER MANUFACTURING COMPANY OF NEW JERSEY.

NEEDLE-BAR FOR SEWING-MACHINES.

SPECIFICATION forming part of Letters Patent No. 478,576, dated July 12, 1892.

Application filed March 16, 1892. Serial No. 425,085. (No model.)

*To all whom it may concern:*

Be it known that I, PHILIP DIEHL, a citizen of the United States, residing at Elizabeth, in the county of Union and State of New Jersey, have invented certain new and useful Improvements in Needle-Bars for Sewing-Machines, of which the following is a specification, reference being had therein to the accompanying drawings.

It is well known to those familiar with sewing-machines that a very large part of the power required to drive the same is expended in operating the needle-bars thereof, the sudden stopping and starting of the needle-bars in their reciprocating vertical movements requiring, when the machines are running at high rates of speed, considerable power. To obviate this objection, it has been proposed to lighten the needle-bars by making them hollow and by running them on internal bearings; but with the constructions heretofore proposed it has not been found practicable to employ needle-bars of this character for the reason that the internal bearings alone could not be relied upon to steady the needle-bars with sufficient accuracy.

My invention has for its object to provide a very light needle-bar, which may be run at a minimum of power at high rates of speed and which will be so steadied and supported that it will operate in an accurate and reliable manner.

To this end my improvement consists in providing a hollow needle-bar, which is preferably made comparatively short, with both inner and outer bearings, which are arranged as low as is practicable, so as to afford steady and reliable supports for the short hollow needle-bar.

In the accompanying drawings, Figure 1 is a front end view of the head or forward part of the bracket-arm of a sewing-machine with my invention applied thereto, and Fig. 2 is a side view of the same. Fig. 3 is a detail view of the rod which forms the internal bearing for the hollow needle-bar; and Fig. 4 is a cross-section of the same on line 4 4, Fig. 3. Fig. 5 is a detail view of the hollow needle-bar, and Fig. 6 is a detail view of the clamping-block connecting the latter with its operating-pitman.

A denotes the head or forward part of the bracket-arm of a sewing-machine; B, the driving-shaft provided with a crank $b$, connected by a pitman $c$ with the clamping-block $d$, secured to the hollow needle-bar E.

F denotes a rod, which is attached at its upper end by a set-screw $a$ to the head A, and the lower part of which is of a size suitable to enter and closely fit within the bore or longitudinal aperture in the hollow needle-bar E and form a longitudinal internal bearing for the latter, the lower end of the said rod being preferably extended below the lower surface of the cross-piece $a'$, which affords an external longitudinal bearing for the said hollow needle-bar. The lower reduced portion of the bearing-rod F, which fits within the hollow needle-bar and forms the internal longitudinal bearing for the latter, is preferably provided with a groove $f$, which admits of the ingress and egress of air to the internal aperture of the hollow needle-bar when the latter is in operation, thereby preventing the tendency of the said bar to stick on said bearing-rod by suction. Instead of making this air-groove in the bearing-rod it is obvious that one or more slight internal air-grooves might be made inside the hollow needle-bar. The internal aperture of the hollow needle-bar is preferably enlarged or flaring at its upper end, as denoted at $e$ in Fig. 5, for the purpose of facilitating the entrance of oil to lubricate the internal bearings.

It will be obvious by reference to the drawings that the hollow needle-bar is of such a length that when it is in its elevated position its upper end is still below the driving-shaft B, from which it is operated; or, in other words, that the said bar is made as short as is practicable for the purpose of making it as light as possible. By thus providing both external and internal longitudinal bearings for the hollow needle-bar the latter may be made so short that it will be very light, while at the same time it will be held so steadily that it will operate with as little tendency to lateral vibration as the long solid needle-bars now in use.

It will be seen by reference to Figs. 1 and 2 that the lower end of the rod F extends through the cross-piece a', in which the external bearing for the hollow needle-bar is formed, so that both bearings are to a considerable extent in the same horizontal plane; or, in other words, the said bearings coincide or overlap each other. This of course insures greater steadiness than could be secured if the said bearings were not thus coincident or in the same horizontal plane.

The ordinary solid needle-bar of the "Singer" machine now in use weighs about two and a half ounces, while my improved needle-bar weighs only about five-eighths of an ounce. Thus in running a sewing-machine having a needle-bar weighing two and a half ounces at the rate of two thousand five hundred stitches per minute it is necessary to start and stop this weight of two and a half ounces five thousand times, this being equal to lifting a weight of about seven hundred and eighty pounds, (gravity being an inconsiderable factor in the downward movements at high speeds,) while as my improved needle-bar weighs only about one-fourth as much as the old needle-bars three-fourths of the power employed in starting and stopping the weight of the old needle-bar is saved, to say nothing about the great saving of power in lessened momentum incidental to the reduced weight.

Having thus described my invention, I claim and desire to secure by Letters Patent—

1. In a sewing-machine, a hollow needle-bar having internal and external longitudinal bearings, substantially as and for the purposes set forth.

2. In a sewing-machine, the combination, with a hollow needle-bar and a rod forming an internal longitudinal bearing for said bar, of an external longitudinal bearing for said hollow needle-bar.

3. In a sewing-machine, the combination, with a hollow needle-bar and a rod forming an internal longitudinal bearing for the same, of an external longitudinal bearing for the said hollow needle-bar, which coincides with or overlaps a portion of the said rod forming the internal bearing.

4. In a sewing-machine, the combination, with a hollow needle-bar and a rod forming an internal longitudinal bearing for the same, said rod being provided with a longitudinal groove for the passage of air, of an external longitudinal bearing for said hollow needle-bar.

In testimony whereof I affix my signature in presence of two witnesses.

PHILIP DIEHL.

Witnesses:
L. B. MILLER,
W. J. PETTIT.